United States Patent

Wespi

[15] 3,701,220

[45] Oct. 31, 1972

[54] ELECTRIC FEED FOR MACHINE ELEMENT

[72] Inventor: George E. Wespi, Holden, Mass.

[73] Assignee: Norton Company, Worcester, Mass.

[22] Filed: Aug. 3, 1970

[21] Appl. No.: 60,288

[52] U.S. Cl. ............51/165.74, 51/165.77, 51/165.8, 51/165.9, 318/569
[51] Int. Cl. .........................................B24b 49/10
[58] Field of Search................................51/165 R, 165 TP, 165.74, 165.75, 51/165.77, 165.8, 165.9, 165.91, 165.92; 318/569, 593, 594, 603

[56] References Cited

UNITED STATES PATENTS

| | | | |
|---|---|---|---|
| 2,723,503 | 11/1955 | Mader | 51/105 SP |
| 2,867,759 | 1/1959 | Comstock | 318/569 |
| 3,056,240 | 10/1962 | Morgan et al. | 51/165 TP |
| 3,121,831 | 2/1964 | Eyler | 318/593 |
| 3,171,234 | 3/1965 | Hill | 51/165.83 X |
| 3,192,675 | 7/1965 | Fries et al. | 51/165 R |
| 3,193,976 | 7/1965 | Luebkemann | 51/165 R |
| 3,309,820 | 3/1967 | Dunn | 51/165.81 |
| 3,466,976 | 9/1969 | Price | 51/165 R |

*Primary Examiner*—Lester M. Swingle
*Attorney*—Thomas L. Tarolli and Calvin G. Covell

[57] ABSTRACT

For a movably mounted element of a machine, an automatic feed, electrically energized and driven, including an electric pulse motor connected to produce sequential equal incremental movements of the movably mounted element and electrical control means therefor featuring a constant frequency pulse generator producing a continuous series of electrical impulses, frequency dividers converting the constant frequency electrical impulses into selected different frequencies of electrical impulses, an automatic control system with adjustable means to initiate and to terminate the application of series of electrical impulses to the electric pulse motor in the directional sense and at the frequencies required to produce a predetermined precise movement, wherein the automatic feed may include an electric pulse motor comprising an electric stepping motor and an hydraulic motor selectively operable alone to displace the movably mounted element and automatically operative with and to assist the electric stepping motor.

20 Claims, 4 Drawing Figures

ELECTRIC FEED FOR MACHINE ELEMENT

BACKGROUND OF THE INVENTION

The continuing development of machines, and particularly machine tools, has been paralleled by the continuing requirement for controlled displacement of movably mounted machine elements, and especially for satisfactory means of feeding and retracting the movably mounted elements of machine tools which support various forms of cutting tool elements, for example, the grinding wheels incorporated in various types of cylindrical grinders such as the grinding machine described and illustrated in Hill U.S. Pat. No. 3,171,234 including multiple grinding wheels arranged to grind crankshaft main bearings, and the grinding machine described and illustrated in Mader U.S. Pat. No. 2,723,503 including workpiece supports arranged to support a crankshaft for grinding its crankpin bearings.

These and other grinding machines included in the prior art incorporate grinding wheel feed mechanisms composed of various different combinations of assorted different electrical, hydraulic, and mechanical mechanisms characterized by respective advantages and limitations inherent in the different mechanisms of which they are composed, and the manner in which they are interconnected.

Comstock U.S. Pat. No. 2,867,759 describes a grinding machine in which the grinding wheel feed includes a feed screw rotated by a servo-motor actuated by an electrically operated precision control and position indicating system, and Morgan, Jr. et al. U.S. Pat. No. 3,056,240 describes several features of an automatic grinding machine, among them a wheel feed including an hydraulic paddle motor to provide a fixed rapid feed and an hydraulic rotary motor the speed and direction of rotation of which are determined by operation of an electro-hydraulic servo-valve controlled from a control station provided with a hand wheel either manually rotated for manual control of wheel head movement, or rotated by a control motor in automatic grinding cycles.

Eyler U.S. Pat. No. 3,121,831 describes an automatic control system for positioning a movable member comprising a null-balance system including first and second differential transformers, a drive motor and a pilot motor all so interconnected operation of the pilot motor displaces the elements of the first differential transformer from their null position as it operates to restore the elements of the second differential transformer to their null position, and alternate operation of the drive motor to return the elements of the first differential transformer to their null position, producing an incremental feed, also operates to displace the elements of the second differential transformer from their null position to initiate another incremental feeding movement.

Dunn U.S. Pat. No. 3,309,820 describes a grinding machine equipped with opposed grinding disks, each mounted for feeding movement toward, and retraction from, a workpiece grinding position by a feed mechanism including an electric stepping motor actuated by a stepping switch and an electrical control semi-automatically operative to produce a number of incremental feeding movements determined by the setting of an adjustable counter relay, and alternatively manually operable to produce repeated incremental movements.

In addition to the electrically operated and/or actuated feed mechanisms described in the several prior patents referred to above, Price U.S. Pat. No. 3,466,976 describes a cylindrical grinding machine equipped with a well-known type of wheel feed mechanism including a feed screw and actuating means therefore to produce successively a rapid feed, a grinding feed, and a fine finish feed, and also includes accessory apparatus for positioning the feed screw to grind workpiece sections of different diameters, which includes an electrically operated rotary hydraulic motor and an electric brake coupled to the opposite ends of a common shaft and thence through a rotary coupling and a shaft connected to the actuating means for producing fine finish feed by rotation of the feed screw.

SUMMARY OF THE INVENTION

This invention relates to an electrically energized and driven automatic feed for a movably mounted machine element, and, as described and illustrated in this application, such an automatic feed useful for feeding the grinding wheel supporting slide in a grinding machine during a grinding operation, particularly in cylindrical grinding machines of the types described in the Mader and Hill patents referred to above.

This feed mechanism conventionally includes a non-rotating element connected to a grinding wheel slide threadably engaged with a feed screw assembly slidably and rotatably mounted in a base slidably supporting the wheel slide, a fast or rapid feed mechanism comprising a piston connected to the feed screw enclosed within a cylinder fixedly secured to the base, means operative to advance the feed screw and thence the wheel slide for rapid feed by applying hydraulic pressure to the rapid feed piston, a precision feed mechanism for advancing the grinding wheel slide during a grinding operation, and alternately for retracting the grinding wheel slide between grinding operations, comprising an electric stepping motor connected to apply a series of incremental rotary movements to the feed screw, and an electrically actuated and operated control for the stepping motor including a constant frequency pulse generator and means to initiate and terminate the application of series of electrical impulses to the electric stepping motor according to a predetermined feeding cycle.

Noting the electric stepping or pulse motor produces limited torque, a rotary hydraulic motor commonly connected to operate alone at a predetermined hydraulic line pressure to move the grinding wheel slide slidably on the base for machine set-up, and otherwise as necessary, may also be coupled to the electric stepping motor and be biased by a relatively reduced line pressure to supply a torque augmenting that of the electric stepping motor, as necessary, to produce grinding or retracting movement of the wheel slide by a series of incremental movements, responsive to operation of the electric stepping motor.

DESCRIPTION OF THE PREFERRED EMBODIMENT

Figure 1:
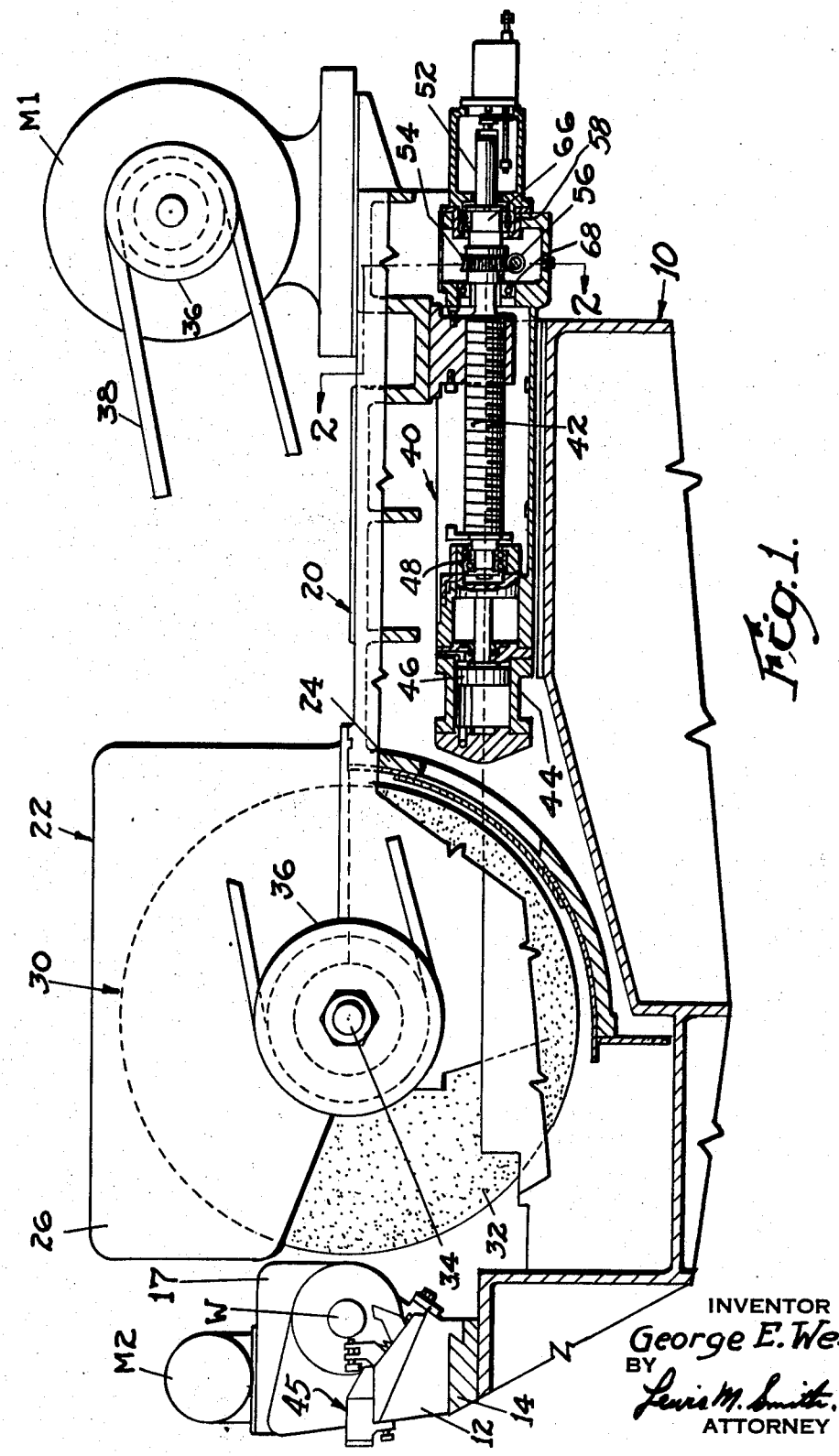
FIG. 1 is a side elevation, partially broken away and partially sectioned on a vertical plane, showing a typical application of the instant invention as a feed mechanism for the grinding wheel slide in a cylindrical grinding machine.

Referring now to the drawings, FIG. 1 comprises a showing of portions of a typical precision grinding machine, the details of which form no part of the instant invention, but representative of one type of machine tool to which this invention may usefully be applied to provide a precisely controlled repetitive feeding movement between a cutting tool and work to be machined thereby, illustrated in FIG. 1 as a grinding wheel assembly generally designated by the reference numeral 30, and as a workpiece W, respectively.

Reference numeral 10 generally designates a base assembly shown as a unitary structure, but alternatively comprising a main base portion, a front table base portion, and an upper portion comprising a wheel slide base, a combination of fixedly interconnected base portions commonly used in precision grinding machines of the general type represented in FIG. 1.

A work table 12 adjustably supported upon base assembly 10 by means of a dovetail support 14 in turn supports a headstock assembly 17 and a cooperating footstock assembly not shown, as required, for supporting and rotating a workpiece W on centers 18 or otherwise, as may be required for the particular workpiece to be machined.

The wheel feed mechanism generally designated by the reference numeral 40, fixedly secured to the base assembly 10, includes a feed screw 42 supported for sliding and rotary motion relative to the base assembly 10 and threadably engaged with a nonrotatable feed nut 28 fixedly secured to the wheel slide 20, a rapid feed cylinder 44 fixedly secured to the base assembly 10 and enclosing a rapid feed piston 46 rotatably connected through the bearing assembly 48 to the feed screw 42 including a shaft extension 52 of the feed screw 42 slidably and nonrotatably coupled to hollow shaft 66 by splines, by a sliding key, or by other suitable means so that hollow shaft 66 rotatably supported in bearing assembly 58 and axially constrained thereby and by thrust bearing assembly 68 rotates feed screw 42 when a worm wheel 54 fixedly secured to hollow shaft 66 is rotated by rotation of a worm 56, supported as described below, in operative engagement with the worm wheel 54.

The grinding wheel assembly generally designated by the reference numeral 30 includes at least one grinding wheel 32 mounted fixedly upon a wheel spindle assembly 34 rotatably supported by the wheel slide 20 and connected to wheel drive motor M1 by means of sheaves 36 and belts 38. For example, see Mader U.S. Pat. No. 2,723,503. Alternatively, the grinding wheel assembly may include several grinding wheels 32 as shown in Hill U.S. Pat. No. 3,171,234.

Figure 2:
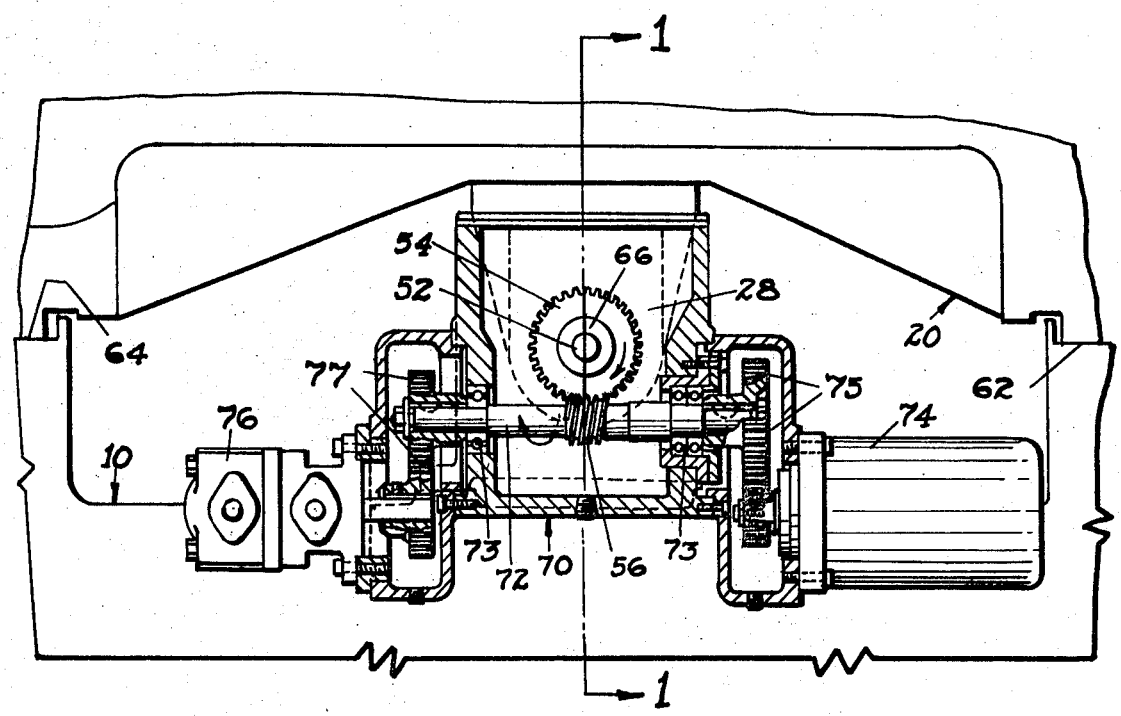
FIG. 2 is a vertical section on line 2 — 2 of FIG. 1 showing additional details of the wheel slide feed mechanism illustrated in FIG. 1.

FIG. 2 shows the manner in which wheel slide 20 is supported for sliding movement relative to base assembly 10 by means of a pair of flats 62 on wheel slide 20 resting in bearing engagement with a pair of flat ways 64 on base assembly 10. FIG. 2 also illustrates the preferred embodiment of the precision feeding drive mechanism generally designated by the reference numeral 70 including a drive shaft 72, rotatably supported in bearing assemblies 73, connected at one end thereof to an electric stepping motor 74 through a suitable drive train shown as comprising spur gears 75, and connected at the other end thereof to a rotary hydraulic motor 76 through a suitable drive train shown as comprising spur gears 77. Thus, operation of either or both of the motors 74 and 76 produces rotation of the worm 56 fixedly secured to drive shaft 72 and thence rotation of worm wheel 54 and hollow shaft 66 slidably engaging shaft extension 52 to produce rotation of the feed screw 42.

The arrangement of an electric stepping motor 74 and a rotary hydraulic motor 76 in the manner illustrated in FIG. 2 and described above comprises an electric pulse motor capable of producing precision equal incremental rotary movements at a precisely controlled frequency established and maintained by a suitable automatic electrical control system therefore, and capable of producing a total torque in excess of the torque produced by commercially available electric stepping motors. This increased total torque is provided by the continuous application of a relatively low line pressure selected so the rotary hydraulic motor 76 produces a torque sufficient, in combination with the torque produced by the electric stepping motor 74, to move the wheel slide 20, but not sufficient, when the electric stepping motor 74 is inoperative, to move the wheel slide 20. With this arrangement, the rotary hydraulic motor 76 may selectively be operated at a relatively high line pressure, when the electric stepping motor 74 is inoperative, and hence unrestrained rotatably, to produce a torque sufficient to move the wheel slide 20 for set up and adjustment of the grinding machine or other machine tool incorporating this arrangement, in the manner corresponding to the prior use of a rotary hydraulic motor solely for this purpose.

Alternatively, this arrangement may be replaced in the instant invention with a commercially available electric pulse motor comprising an electrically actuated servo valve controlling a rotary hydraulic motor capable of producing a torque sufficient to move the wheel slide 20.

Figure 3:
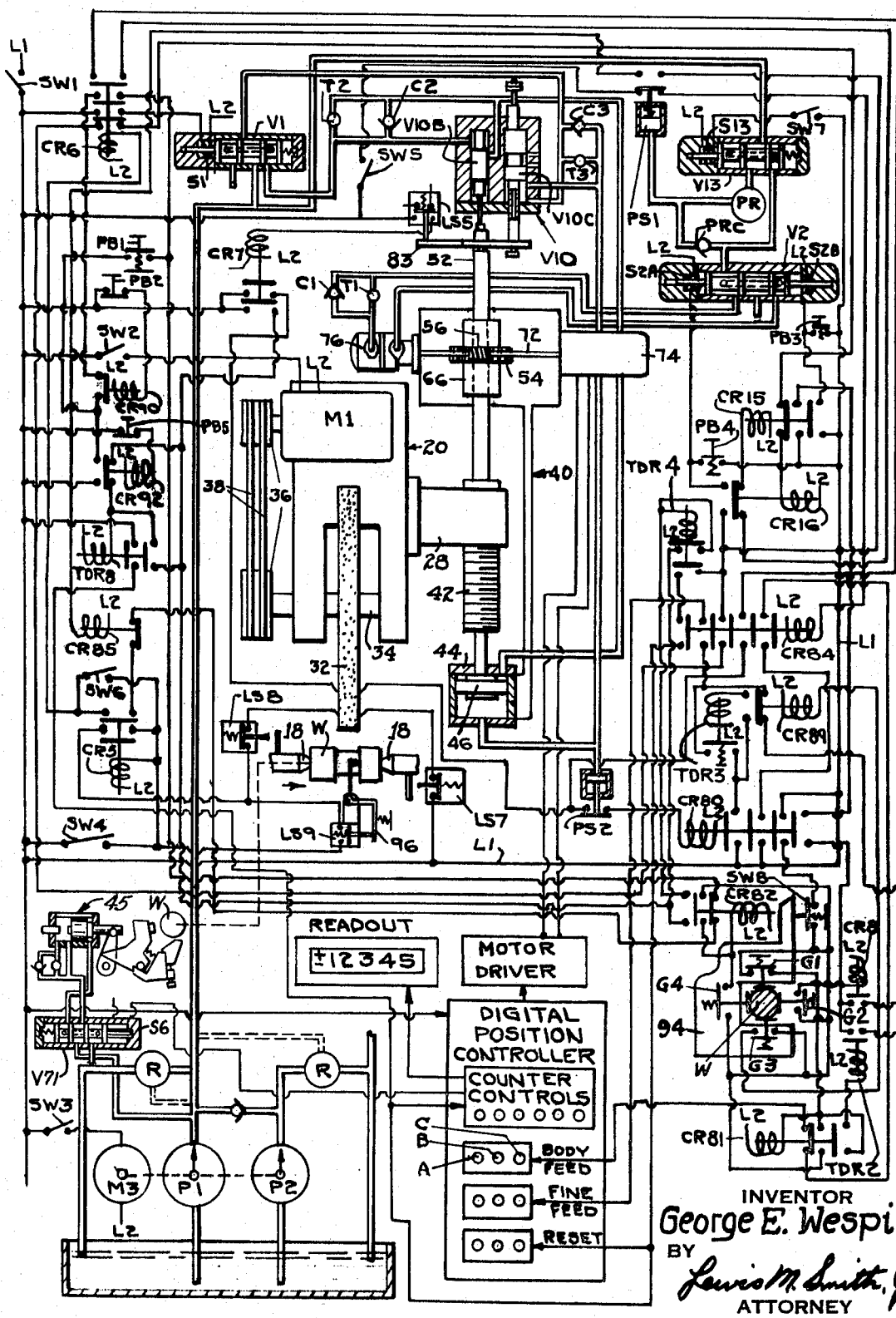
FIG. 3 is a simplified schematic representation of mechanical, electrical, and hydraulic components of the wheel slide feed mechanism illustrated in FIG. 1.

Referring now to the showing in FIG. 3 comprising a schematic of the automatic control system for the wheel feed mechanism of the precision grinding machine illustrated in FIGS. 1 and 2, the following description of the operation of the wheel feed mechanism is best understood in relation to the showing in FIG. 3.

Closing main switch SW1 in line L1 supplies power to the system, energizing control relays CR90 and CR92 through normally closed pushbutton PB2 and normally closed pushbutton PB5, respectively, so that the normally open contacts of control relays CR90 and CR92 close and the normally closed contacts of control relay CR92 open. Closing switch SW2 starts the wheel drive motor M1, and closing switch SW3 starts pump motor M2 to drive hydraulic pumps P1 and P2.

Oil under pressure is supplied to solenoid operated valves V1 and V13, and through valve V1 into the valve generally designated by reference numeral V10 and into rapid feed cylinder 44 holding the wheel slide 20 and the respective spools of the valve V10 in their retracted positions as shown in FIG. 3.

Oil pressure opens the normally closed contacts of pressure switch PS2 maintaining de-energized control relay CR80 so that the normally open contacts of control relay CR80 remain open, and oil under pressure passes through valve V13 to pressure switch PS1 by way of a pressure reducer valve PR set below the pressure required to operate pressure switch PS1 against its spring, so that its normally closed contacts remain closed and its normally open contacts remain open.

Oil under pressure passes through pressure reducing check valve PRC and thence through valve V2 to both sides of rotary hydraulic motor 76 thus maintained inoperative.

Closing switch SW5 establishes the circuit for operation of the wheel feed mechanism through normally closed contacts of pressure switch PS1 energizing control relay CR84 to close the normally open contacts thereof, energizing control relay CR16 through normally closed contacts of control relays CR6 and CR15 to close normally open contacts of control relay CR16, thereby energizing solenoid S2A of push type self-centering solenoid valve V2 thereby moved to the right from its centered position shown in FIG. 3.

With valve V2 so positioned, hydraulic motor 76 is maintained biased in the sense to hold the wheel slide in retracted position, by oil under pressure passing through check valve C1 to one side of the motor while the other side is connected through valve V2 to exhaust.

The circuits relating to the operation of means for loading and precisely positioning the workpiece are the same as the corresponding portion of the disclosure in Hill U.S. Pat. No. 3,171,234 to which reference may be had for a description of the corresponding arrangement illustrated therein.

The simplified schematic representation in FIG. 3 of the system for precise endwise location of the workpiece W relative to the grinding wheel 32 includes a pivotally supported endwise locating finger 96, shown in operative engagement with a suitable reference surface on workpiece W, with an associated limit switch LS9, and workpiece centers 18 with associated limit switches LS7 and LS8.

In a typical grinding machine installation, the right hand center in FIG. 3 is advanced to the left to support an unground workpiece W between centers, allowing the normally closed contacts of limit switch LS7 to close as shown in FIG. 3, and then the left hand workpiece center 18 in FIG. 3 is advanced to the right, allowing the normally closed contacts of limit switch LS8 to close as shown in FIG. 3. The endwise locating finger 96 and limit switch LS9 are so adjusted in relation to the reference surface on the workpiece W that the normally open contacts of limit switch LS9 are closed when workpiece W is properly located endwise relative to the grinding wheel 32 to interrupt movement of the left hand workpiece center 18 to the right, as described in Hill U.S. Pat. No. 3,171,234.

With the normally open contacts of limit switch LS9 closed briefly until the endwise locating finger 96 is retracted from engagement with the workpiece W prior to the grinding operation, control relay CR5 is energized to close its normally open contacts to ready circuits including push button PB1 and switch SW6, and also to maintain control relay CR5 energized after the contacts of limit switch LS9 open when the endwise locating finger 96 is retracted, as described in Hill U.S. Pat. No. 3,171,234.

The wheel feed cycle may be initiated either manually by closing push button PB1 for semi-automatic operation of the grinding machine or automatically by closing switch SW6 upon completion of the previous wheel feed cycle for fully automatic operation of the grinding machine through a series of wheel feed cycles.

Closing push button PB1 or switch SW6 energizes control relay CR6 through closed normally open contacts of control relay CR92, through normally closed contacts of control relay CR82, through normally closed contacts of control relay CR85, and through closed normally open contacts of control relay CR5.

With control relay CR6 energized, its normally closed contacts open to de-energize control relay CR16 opening its normally open contacts to de-energize solenoid S2A so valve V2 returns to its center position as shown in FIG. 3. With control relay CR16 de-energized, its normally closed contacts close to ready a circuit including these contacts.

With control relay CR6 energized to close its normally open contacts, solenoid S1 is energized to shift valve V1 to the right as seen in FIG. 3 to pass oil under pressure to rapid feed cylinder 44, first through check valve C2 by-passing throttle valve T2 and then through valve V10 after valve spool V10B is displaced from its retracted position with the wheel slide 20. At the same time, oil is exhausted from the forward end of rapid feed cylinder 44 rapidly until valve spool V10C moving with the wheel slide 20 closes off the unrestricted connection to exhaust through valves V10 and V1, after which shoulder feed begins at a somewhat slower rate determined by the setting of throttle valve T3 connected in parallel with check valve C3 closed to the flow of oil from the forward end of rapid feed cylinder 44 to exhaust through valve V1.

Forward movement of the limit switch control bar 83 with the wheel slide 20 allows normally closed contacts of limit switch LS5, held open when the wheel slide is in its fully retracted position, to close, thereby energizing control relay CR7 to close its normally open contacts energizing control relay CR15 through normally closed contacts of control relay CR84, normally open contacts of control relay CR6, now closed because it is energized, and normally closed contacts of control relay CR16.

Normally open contacts of control relay CR15, closed when it is energized, energize solenoid S2B to shift self-centering valve V2 to the left from its centered position shown in FIG. 3 to allow oil underpressure to be exhausted from rotary hydraulic motor 76 through a regulating needle valve T1. However, since the pressure of the oil admitted to the hydraulic motor 76 is reduced by pressure reducer valve PR below the level necessary to move the wheel slide 20 solely by means of the hydraulic motor 76, the hydraulic motor 76 remains at rest, but so biased as to assist the electric stepping motor 74 to advance the wheel slide 20 whenever stepping motor 74 is pulsed.

When the rapid feed piston 46 bottoms at the front end of the rapid feed cylinder 44, the pressure in the return line drops, allowing the normally closed contacts of pressure switch PS2 to close, thereby energizing control relay CR80 through normally open, now closed, contacts of control relay CR7, closing normally open contacts of control relay CR80 to energize the fast feed rate control of a digital position controller which generates a series of pulses delivered to the motor driver and thence to the electric stepping motor 74 through closed, normally open, contacts of control relay CR84 and through normally closed contacts of control relay CR81.

The electric stepping motor 74 assisted by the rotary hydraulic motor 76 produces incremental rotary movements of the feed screw 42 and the wheel slide 20 advances at a selected fast or body feed rate set by adjustment of the knobs on decade switches adjustable to determine the fast or body feed rate.

For example, in a machine arranged to produce a feed increment of 0.0,006 inches per pulse, knob A adjustable to produce from 100 to 900 pulses per second will produce a feed rate from 0.060 to 0.540 inches per minute, knob B adjustable to produce from 10 to 90 pulses per second will produce a feed rate from 0.006 to 0.054 inches per minute, and knob C adjustable from 1 to 9 pulses per second will produce a feed rate from 0.0,006 to 0.0054 inches per minute. Thus, the desired total body feed rate per minute, between 0.0006 and 0.5994 inches per minute, is obtained by selecting the proper setting of each of knobs A, B, and C.

The digital position controller counts the number of pulses applied to the electric stepping motor 74 and simultaneously operates the digital readout which provides a continuous indication of the amount of stock remaining to be removed from the workpiece diameter.

The control system illustrated in FIG. 3 includes an in-process gage assembly or assemblies, including a plurality of sets of contacts G1, G2, G3, and G4, which can feasibly be applied to the workpiece W manually, but preferably is applied automatically by gage assembly positioning means activated by a signal from the digital position controller after a predetermined number of pulses has been counted and before the size of the workpiece W is reduced by the grinding wheel 32 to the dimension at which the first set of contacts G1 is operative.

Since various different types of in-process gage assemblies are available commercially, and since the specific details of the gage assembly used in association with the control system illustrated in FIG. 3 form no part of the instant invention, the caliper portion of a gage assembly 94 is indicated in FIG. 3 in operative relation to the workpiece W by a simplified schematic representation thereof, and the respective sets of gage contacts are represented by normally closed sets of electrical contacts mechanically maintained open until the workpiece W reaches the size at which they are set to operate to perform their respective functions. However it will be evident these sets of gage contacts may be air pressure actuated or any other suitable type commercially available, arranged either to close or to open electrical contacts or other means responsive to their operation.

Referring to showing in FIG. 3, the gage assembly 94 is so arranged that the normally open contacts of switch SW8 are closed to energize the circuit including the four sets of gage contacts G1, G2, G3, and G4 when the caliper portion of the gage assembly 94 is positioned in operative relation to a workpiece W supported in the grinding machine on centers 18.

When advance of the grinding wheel 32 at the body feed rate has reduced the diameter of the workpiece W sufficiently to allow the first set of gage contacts G1 to close, relay CR81 is energized to open its normally closed contacts and thereby interrupt the advance of the wheel slide 20 at the body feed rate, and to close its normally open contacts to energize time delay relay TDR2 with normally open contacts timed to close a predetermined interval after energization.

Continued grinding during the consequent dwell reduces the diameter of the workpiece W an additional small amount sufficient to allow the second set of gage contacts G2 to close, energizing control relay CR8 to close its normally open contacts to initiate further advance of the wheel slide 20 by resumed transmission of pulses to the electric stepping motor 74 at the fine or sizing feed rate through normally open now closed contacts of control relays CR80, CR8 and CR84, and the normally closed contacts of control relay CR89.

Additional normally open contacts closed when control relay CR81 is energized provide a holding circuit to maintain control relay CR81 energized through closed contacts of control relay CR80 and closed switch SW8.

The time delay relay TDR2 is set to close a predetermined time interval after it is energized slightly in excess of the time ordinarily required for the workpiece W to reach the size at which the set of gage contacts G2 is closed to initiate the fine or sizing feed. If the workpiece W fails to reach the size at which the set of gage contacts G2 closes, or if this set of gage contacts fails to operate to initiate the fine feed by energizing control relay CR8, the delayed closing of the normally open contacts of time delay relay TDR2 energizes control relay CR8 to initiate the fine feed.

The electric stepping motor 74 and rotary hydraulic motor 76 together advance the wheel slide 20 by the same equal increments as for the body feed but at a lower frequency of pulses and hence at a slower rate determined by the settings of the respective decade switches selectively adjustable to provide the desired fine feed rate.

In grinding operations which do not require a dwell between the body feed and the fine feed, the set of gage contacts G2, control relay CR8, and time delay relay TDR2 may be eliminated, in which case the normally open contacts of control relay CR81 first mentioned above may be replaced by the normally open contacts of control relay CR8 so that the fine feed of wheel slide 20 is initiated simultaneously with the interruption of the body feed of wheel slide 20, both by the energization of control relay CR81 when the set of contacts G1 is closed.

Referring further to the showing in FIG. 3, the fine feed continues until the workpiece W approaches final size at which point the third set of gage contacts G3 closes, energizing control relay CR89 to open the normally closed contacts thereof and thereby interrupt the fine feed, and thus provide for finishing the workpiece W to final size during a second dwell.

When control relay CR89 is energized, its normally open contacts are closed to energize a time delay relay TDR3 with normally open contacts timed to close a predetermined time interval after energization slightly in excess of the time usually required for the workpiece W to reach its final size.

With the circuit to the fine feed control broken by the de-energization of control relay CR89, the stepping motor 74 stops, but remains capable of exerting its maximum torque, and the rotary hydraulic motor 76 remains so biased by fluid pressure as to tend to advance the wheel slide 20. Consequently wheel slide 20 remains at rest in its forward position during the second dwell until the workpiece rounds up and its diameter is reduced to its final size, whereupon the fourth set of gage contacts G4 closes energizing control relay CR82.

If the workpiece W fails to reach its final size, to close the set of gage contacts G4, the normally open contacts closed when time delay relay TDR3 times out re-energize the circuit to the fine feed control to resume the fine feed until the set of gage contacts G4 operates to energize control relay CR82.

With control relay CR82 energized one set of its normally open contacts closes to provide a holding circuit for control relay CR82 through now closed contacts of switch SW8 and normally open now closed contacts of control relay CR80, and another set of its normally open contacts closes to energize a time delay relay TDR4 through normally open now closed contacts of control relay CR7. One set of normally open contacts of time delay relay TDR4 closes immediately to establish a holding circuit for time delay relay TDR4 and the other set of normally open contacts of time delay relay TDR4 is timed to close a predetermined short time interval, after energization.

The energization of control relay CR82 also opens its normally closed contacts through which control relay CR6 is energized and maintained energized during the wheel feed portion of the grinding cycle. With control relay CR6 de-energized its normally open contacts open breaking its holding circuit and de-energizing control relay CR15 and solenoid S1 in valve V1.

With control relay CR15 de-energized its normally open contacts open de-energizing solenoid S2B and its normally closed contacts close energizing control relay CR16 through now closed normally open contacts of control relay CR84 and the normally closed contacts of control relay CR6. With control relay CR16 energized its normally open contacts close energizing solenoid S2A to shift self-centering valve V2 to the right from its centered position shown in FIG. 3 to apply oil under pressure to the rotary hydraulic motor 76 in its reverse direction so that it is biased in the sense required to retract the wheel slide 20 toward its fully retracted position shown in FIG. 3.

With solenoid S1 de-energized valve V1 shifts to the left as seen in FIG. 3 and oil under pressure passes through check valve C3 to the forward end of rapid feed cylinder 44 and opens the normally closed contacts of pressure switch PS2 de-energizing control relay CR80, thereby opening the normally open contacts of control relay CR80 to de-energize control relays CR81, CR82, and CR89.

With the rotary hydraulic motor 76 meanwhile biased to tend to retract the wheel slide 20, the closing of the timed to close normally open contacts of time delay relay TDR4 completes the circuit to the reset control in the digital position controller operative at the rate determined by the setting of its respective decade switches to transmit a predetermined number of pulses to the electric stepping motor 74 to rotate it in the reverse direction to retract the wheel slide 20 to the starting position from which its next feeding movement controlled by the electric stepping motor 74 will be initiated.

When rapid feed piston 46 bottoms at the rear end of rapid feed cylinder 44, valve spools V10B and V10C are returned to their fully retracted positions shown in FIG. 3 and the normally closed contacts of limit switch LS5 are opened by limit switch control bar 83 to de-energize control relay CR7 so that its normally open contacts open to de-energize the holding circuit for the time delay relay TDR4.

The release of the ground workpiece W from the grinding machine by the movement to the right of the right hand workpiece center 18 in FIG. 3 opens the normally closed contacts of limit switch LS7 interrupting the holding circuit for control relay CR5 through the normally closed contacts of limit switches LS7 and LS8.

As indicated further above, if switch SW6 is maintained closed to by-pass push button PB1, the movement of the left hand workpiece center 18 in FIG. 3 to the right sufficiently to properly position the next unground workpiece W endwise relative to the grinding wheel 32 will rotate the endwise locating finger 96 sufficiently to close the normally open contacts of limit switch LS9, energizing control relay CR6 and simultaneously energizing control relay CR5 to establish and maintain the circuits required for the next wheel feed cycle.

If the relatively reduced pressure supplied to rotary hydraulic motor 76 during the wheel feed cycle to maintain the rotary hydraulic motor 76 biased to assist electric stepping motor 74 gets too high, for example by failure of the pressure reducing valve PR, the normally closed contacts of pressure switch PS1 open de-energizing control relay CR84 so that its normally open contacts open to de-energize several circuits required for completion of the wheel feed cycle. In addition, the opening of pressure switch PS1 will close its normally open contacts energizing control relay CR85 to open its normally closed contacts either to prevent energization of or to de-energize control relay CR6 and solenoid S1 in valve V1, so that the wheel slide 20 remains in or returns to its fully retracted position shown in FIG. 3.

The means for moving the wheel slide 20 for set-up and adjustment of the grinding machine, with electric stepping motor 74 de-energized and unrestrained rotatably, includes a switch SW7 which when closed energizes solenoid S13 to shift valve V13 to the right to by-pass pressure reducing valve PR and apply full line pressure to both sides of rotary hydraulic motor 76. When push button PB3 is closed solenoid S2B is energized to shift self-centering valve V2 to the left from its position as shown in FIG. 3 to produce forward movement of the wheel slide 20 solely by rotation of the hydraulic motor 76. When the push button PB4 is closed solenoid S2A is energized to shift self-centering valve V2 to the right from its position as shown in FIG. 3 to produce rearward movement of the wheel slide 20 solely by rotation of the rotary hydraulic motor 76.

Zero reset push button PB5 may be pushed during the manual wheel feed cycle to retract the wheel feed mechanism and to reset the control system therefor. When push button PB5 is depressed manually its normally closed contacts are opened de-energizing control relay CR92 so that its normally open contacts open de-energizing the holding circuit for control relay CR6 to terminate forward movement of the wheel slide 20 and to initiate retracting movement of the rapid feed piston 46 in the rapid feed cylinder 44 to return the wheel slide 20 to its fully retracted position.

When the control relay CR92 is energized, its normally closed contacts close to energize time delay relay TDR8. One set of normally open contacts, closed immediately when time delay relay TDR8 is energized, establishes a holding circuit therefore, and another set of normally open contacts, timed to close a predetermined time interval after energization, closes, after a predetermined time sufficient to accommodate reversal of the pressure applied to rotary hydraulic motor 76 in the manner described further above, to complete a circuit to the digital position controller to reset its zero reference, to activate the reset control to transmit pulses to rotate the electric stepping motor 74 in the retract direction and to retract the gage head assembly 94 and otherwise to prepare the wheel feed mechanism and the control system therefor, for the next wheel feed cycle.

Any suitable means may be provided to render the zero reset push button PB5 inoperative during an automatic wheel feed cycle, such as a switch connected in parallel with push button PB5 arranged to be closed when switch SW6 is closed for repetitive fully automatic wheel feed.

Should it become necessary to interrupt the wheel feed cycle at any time either during a manual cycle or during an automatic cycle, an emergency return push button PB2 may be depressed manually momentarily to open its normally closed contacts to de-energize control relay CR90. When control relay CR90 is de-energized its normally open contacts open to break the holding circuit for control relay CR6, thereby de-energizing control relay CR6 and solenoid S1 to retract the wheel slide 20 immediately by retracting the rapid feed piston 46 in the rapid feed cylinder 44.

Figure 4:
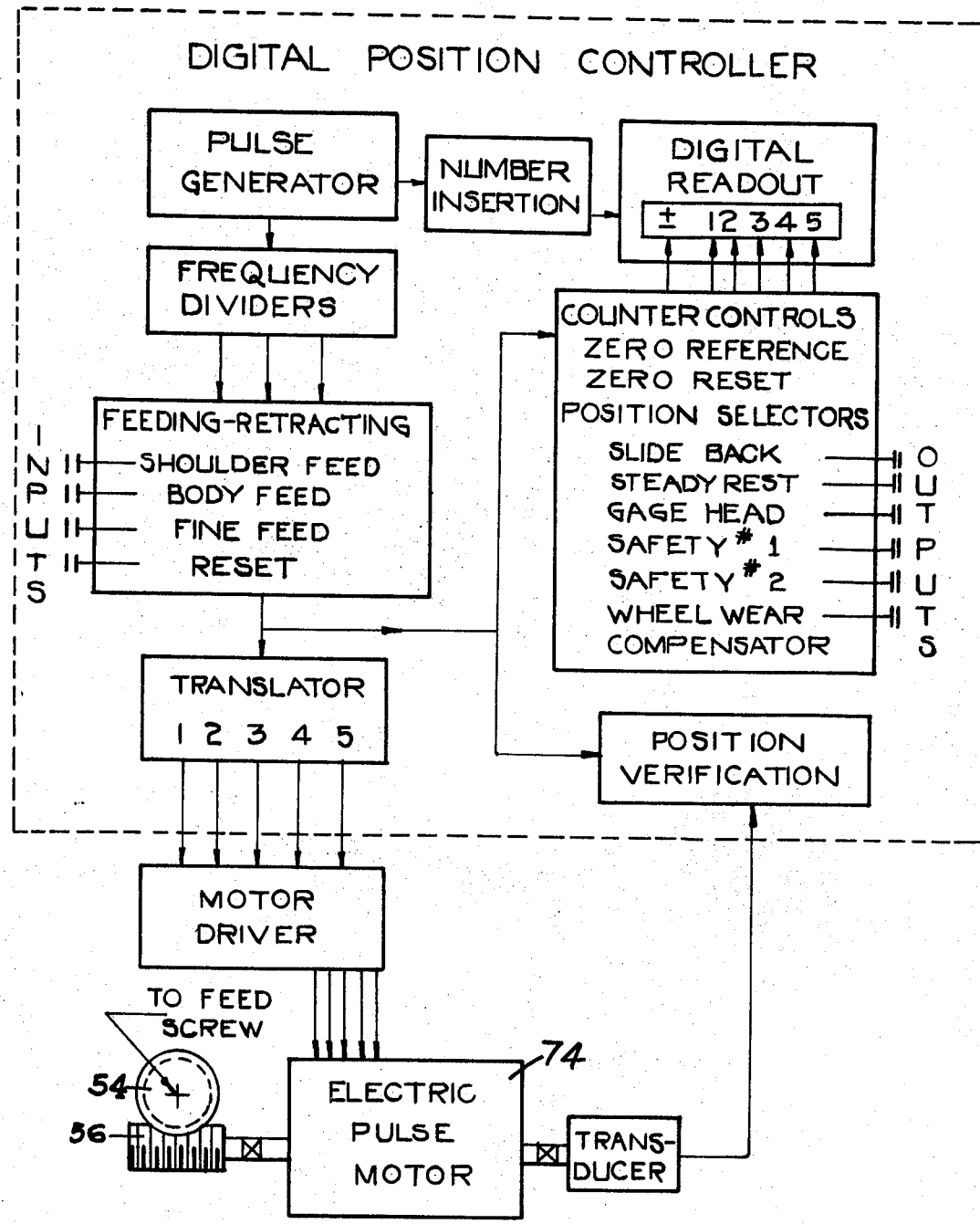
FIG. 4 is a block diagram of the components included in the digital position controller and also showing schematically its operative connection to the electric stepping or pulse motor also shown in FIGS. 2 and 3.

The digital position controller represented schematically in FIG. 3 in operative relation to the control system for the wheel feed mechanism of a grinding machine and shown in somewhat greater detail in the block diagram comprising FIG. 4 provides for the digital selection of constant pulse rates effective to assure a precisely controlled feed cycle, and also the repeatability of this cycle for machining a series of workpieces in volume production all to the required quality with respect to the desired finish and to close dimensional tolerances. Accordingly, the digital position controller includes a pulse generator comprising a crystal oscillator energized when switch SW1 is closed and operative at a precisely controlled predetermined unvarying frequency.

Details of the respective electronic components, operative on a binary number system, together comprising the digital position controller illustrated and described herein, are not illustrated or described in detail here, since they form no part of the instant invention and since they are commercially available from various manufacturers including Dynapar Corporation in Gurnee, Ill.

Frequency dividers connected to the pulse generator are operative to convert the relatively very high frequency produced by the crystal oscillator to a relatively much lower range of frequencies useful in an automatic feed embodying the instant invention.

The rate selector assembly for determining the rates of the respective feeds and the rate of retraction includes a series of sets of decade switches as described above and illustrated schematically in FIG. 3, each set of decade switches being adjustable within a predetermined range of frequencies provided by the frequency dividers to provide the appropriate feed rate for that particular portion of the wheel feed cycle.

Referring to the fast or body feed rate specified by way of example further above, the fine or sizing feed rate is desirably set by adjusting the knobs A, B and C of the fine feed rate control to a feed rate substantially less than the body or fast feed rate, and the reset rate for retracting the wheel slide 20 is preferably set at a higher rate than the body feed rate to minimize the time required to reset the wheel feed mechanism for the next feed cycle.

Recalling the grinding wheel control system as described above provides a shoulder feed at a rate intermediate between the fast feed rate and the body feed rate by restricting discharge from the fast feed cylinder 44 as the fast feed piston 46 approaches the forward end of the fast feed cylinder 44, before the electric stepping motor 74 is pulsed at the rate determined by the setting of the body feed rate control, the shoulder feed alternatively may be provided by the electric stepping motor 74 after the fast feed piston 46 reaches the forward end of the fast feed cylinder 44 is the rate selector assembly includes a shoulder feed rate control as indicated in FIG. 4 with a set of decade switches therefor adjustable to produce the desired shoulder feed rate, in which case the circuits included in the control system are modified to actuate the body feed rate control after the shoulder feed rate control is first energized to initiate operation of the electric stepping motor 74 first at the desired shoulder feed rate, and then at the desired body feed rate.

When each of the feed rate controls and the reset rate control is actuated by the respective in-puts thereto from the control system as described further above, pulses at the rate determined thereby and in the proper sense are transmitted via the translator and thence the motor driver to the electric pulse motor 74 to produce a series of incremental rotary movements thereof at the desired rate in the forward direction in response to pulses from the respective feed rate controls and in the reverse direction in response to pulses from the reset rate control. The translator is represented in FIG. 4 as provided with five channels connected to the motor driver and thence to the electric pulse motor, since the electric pulse motors commercially available typically include a rotor divided into several and commonly five individually operative functional segments angularly offset and sequentially energized to produce smaller incremental rotary movements of the rotor at a higher frequency than is practical with a rotor having a single functional unit.

As indicated in FIG. 4, the digital position controller also includes various components designated counter controls including a means to establish a zero reference at the point at which the W feed cycle is completed with the workpiece W at the desired final size, a means operative to reset the zero reference at the end of each wheel feeding cycle when the fine feed is interrupted by the operation of the fourth set of gage contacts G4, when the workpiece 0 reaches its desired final size, and a plurality of so-called position selectors comprising preset position sensors activated when the precision feeding drive mechanism is actuated to count the number of pulses delivered to the electric stepping motor 74 and including coincidence circuits operative at predetermined numbers of counts determined by the settings of these preset position sensors to initiate or terminate various different machine functions as described below.

The slide back preset position sensor is activated when the reset feed control is actuated to count the number of pulses delivered to the electric stepping motor 74 to operate it in its reverse direction, and operative at a preset predetermined number of counts to stop the electric stepping motor 74 with the wheel slide 20 in the desired precisely located starting position for the precision feeding drive mechanism.

The steadyrest preset position sensor activated when the precision feeding drive mechanism is actuated for feeding movement to count the number of pulses delivered to the electric stepping motor 74 to operate it in its forward direction, and is operative when it counts out at a predetermined number of counts to actuate means, such as, a solenoid S6 which upon energization shifts valve V71. Fluid under pressure is directed by valve V71 to advance a steadyrest assembly 45 into operative engagement with the workpiece W substantially as taught in U.S. Pat. No. 3,171,234 to which reference may be had for details not disclosed herein. Mader U.S. Pat. No. 2,723,503 and Hill U.S. Pat. No. 3,171,234 show and describe representative steadyrest assemblies and hydraulic cylinder assemblies operative to move the respective steadyrest assemblies into and out of engagement with a workpiece.

The gage head preset position sensor is also activated when the precision feeding drive mechanism is actuated for feeding movement to count the number of pulses delivered to the electric stepping motor 74 to operate it in its forward direction, and is operative when it counts out at a second predetermined number of counts to actuate means to advance the gage head assembly 94 into operative relation to workpiece W. As indicated further above, the design details of the means to move the gage head assembly into and out of its position in operative relation to the workpiece W may comprise any suitable mechanical linkage interconnecting the gage head assembly and a relatively fixed portion of the grinding machine actuated by a suitably located hydraulic cylinder assembly.

The steadyrest and gage head preset position sensors are set to count out while the body feed rate control is operative to deliver pulses to the electric stepping motor 74 and before the workpiece W reaches the size at which the first set of gage contacts G1 is operative.

The preset position sensor designated safety No. 1 is activated when the precision feeding drive mechanism is actuated to count the number of pulses delivered to electric stepping motor 74 to operate it in its forward direction, and is operative when it counts out at a predetermined number of counts to interrupt the delivery of pulses to the electric stepping motor 74 by the body feed control and to actuate the fine feed rate control, if the component or components of the control system normally operative to interrupt the body feed rate control and to actuate the fine feed rate control fail to operate in the normal manner. Accordingly, the preset position sensor designated safety No. 1 is preferably set to operate at a number of counts slightly in excess of the number of counts at which the first set of gage contacts G1 normally operates, in order to be sure the rate of feed is reduced from the body or fast feed rate to the fine or sizing feed rate before the workpiece W closely approaches its final size.

Since the starting point for the precision feeding drive mechanism is determined by the number of counts from the zero reference at which the slide back preset position sensor operates, and since the set of gage contacts G4 is necessarily adjusted to operate between the upper and lower tolerances for the final size of the workpiece W and preferably somewhat above the minimum tolerance, another preset position sensor designated safety No. 2 is activated when the precision feeding drive mechanism is actuated to count the number of pulses delivered to the electric stepping motor 74 to operate it in its forward direction, and is operative when it counts out at a predetermined number slightly in excess of the number of counts required to reach the zero reference, but within the minimum final size, to interrupt feeding movement and initiate retracting movement as by energizing control relay CR82 normally energized by operation of the set of gage contacts G4, but not operative to actuate the zero reset means. Accordingly, if the gage contacts normally operative to terminate the wheel feed cycle when the workpiece W reaches its desired final size fail to function properly, the preset position sensor designated safety No. 2 functions to terminate the wheel feed cycle and to retract the wheel slide 20 before the workpiece W is reduced to a final size below the minimum tolerance therefore.

Since a grinding machine of the type illustrated and described herein usually includes a truing device or devices operative periodically as required to restore the desired contour and surface condition of each grinding wheel 32, the counter controls may conveniently also include a wheel wear compensator preset position sensor activated when pulses are delivered to the electric stepping motor 74 to operate it in its forward direction to compensate for the determined reduction in wheel size resulting from each truing operation, and operative when it counts out at a predetermined number of counts corresponding to the amount of reduction of the wheel size to interrupt the delivery of the compensating pulses to the electric stepping motor 74.

Anticipating the possibility of a transient power failure during any given wheel feed cycle, the counter controls also include means operative when power is restored to actuate the zero reset means at the point in the wheel feed cycle at which the power failure occurred and to actuate the reset feed control and the slide back preset position sensor in the same manner as when control relay CR82 is energized by operation of the set of gage contacts G4, so that the wheel slide 20 is retracted to a starting point for the precision feed drive mechanism determined by the operation of the slide back preset position sensor at the number of counts from the zero reference for which it is adjusted. This automatic response to a transient power failure with main switch SW1 closed and the grinding machine in operation provides assurance that the restoration of power with the grinding machine set for repetitive fully automatic wheel feed cycles will not cause damage to the machine or destruction of any workpieces, because the operation of the zero reset means at the point of power failure and the activation of the slide back preset position sensor at that point assures retraction of the wheel slide 20 to a starting point for the precision feeding drive mechanism to the rear of its normal starting point. Consequently, the wheel slide 20 does not again reach the location at which a workpiece W is ground down to its final size, until the control system is adjusted by the machine operator to reestablish the zero reference at that location, as is done during machine set-up.

As indicated by the showing in FIGS. 3 and 4, the digital position controller includes a digital readout, suitably located for convenient observation by the grinding machine operator, operatively connected to the counter controls and incorporating suitable digital indicating means such as a display of Nixie tubes operative in the conventional manner. During grinding machine set-up, the digital readout is adjusted to read zero with the wheel slide 20 positioned at the zero reference point at which the workpiece W reaches final size. As the wheel slide 20 is retracted to the precisely predetermined starting point for the precision feeding drive mechanism, the digital readout counts up to indicate the amount of stock, on its diameter, to be removed from an unground workpiece W, and, as the wheel slide 20 is advanced during a feeding cycle, the digital readout provides a continuous indication of the diminishing amount of stock remaining to be removed from the workpiece W being ground.

Once the digital readout has been properly adjusted to function in this manner it does so during each succeeding wheel feed cycle so long as the grinding machine remains energized. However, since conventional digital readouts have no memory, such a unit incorporated in the control system for a grinding machine or other machine tool ordinarily drops to zero whenever the system in which it is incorporated is de-energized, and must be reset whenever the system is re-energized.

In order to eliminate this problem, the instant invention includes in the digital position controller number insertion means interconnecting the pulse generator and the digital readout and operative in response to the pulses generated by the pulse generator, whenever the system is energized with the wheel slide in its fully retracted position, to count up to the number which should appear on the digital readout with the precision feeding drive mechanism in its precisely predetermined starting position, as determined by the prior adjustment of the digital readout in the manner described above. Consequently this number insertion means is operative almost instantaneously to restore the proper reading on the digital readout each time the control system is re-energized with the wheel slide in its fully retracted position.

Since operator and equipment safety are of paramount importance, and since their safety depends upon the accurate maintenance of the proper position of the wheel slide 20 at all times consistent with the number and sense of the pulses transmitted to the electric stepping motor 74 by the control system therefore, the digital position controller is operated in a closed-loop mode through a feed back transducer comprising a pulse generator connected to and driven by the electric stepping motor 74, and through a position verification unit including pulse comparing means to compare for coincidence an input indicating the cumulative number of pulses transmitted to the electric stepping motor 74, through the respective feed rate controls and the reset rate control, with an input indicating the cumulative number of pulses generated by the motor driven transducer. The position verification unit also includes safety stopping means operative to interrupt the wheel feed cycle whenever the difference between these respective cumulative sums exceeds a predetermined small amount within a tolerable error level for the machine with which the control system described herein is associated.

Noting various types of electric pulse motors are subject to a pulse lag under dynamic conditions the magnitude and duration of which depends upon the type of electric pulse motor employed, the error level at which this means for interrupting the wheel feed cycle operates should be set high enough to exceed the normal pulse lag for the particular type of electric pulse motor used. For example the electric stepping motor 74 is subject to a small pulse lag during acceleration, but catches up when it reaches a constant speed.

On the other hand, an electrohydraulic stepping motor using a small fast-responding electric pilot pulse motor to position a servo valve spool in turn controlling a larger hydraulic torque motor has a relatively higher count lag and the output shaft of the electric pilot pulse motor must retain its pulse lag in order to keep the valve spool open and maintain the flow of oil to the hydraulic torque motor. In order to provide additional more precise position control, the means for interrupting the wheel feed cycle included in the position verification unit is also operative at a second relatively lower error level while the electric stepping motor 74 is not being pulsed, and hence in a static condition with no pulse lag, during the time interval between the energization of time delay relay TDR4 when forward rotation of the electric stepping motor is interrupted and the closing of its timed to close contacts to initiate rearward rotation of the electric stepping motor 74.

Thus, the apparatus described and illustrated herein comprises an automatic feed control including an automatically cycled feed mechanism for a cutting tool and a control system therefor including an operation counter and control means capable of providing precise control of a repetitive feed cycle for machining a series of workpieces to finish dimensions within extremely close tolerances, and various safety means automatically operative to protect the machine operator and the machine itself.

In addition, since each succeeding feed cycle is normally terminated by the operation of a set of gage contacts when each workpiece machined reaches the desired precise final size, and since the zero reference from which the feed mechanism is reset is itself normally reset prior to each succeeding feed cycle, the automatic feed control embodied in the apparatus described and illustrated herein is fully compensated dimensionally between succeeding feed cycles for transient dimensional variations produced by ambient temperature changes, by heat build-up in the various machine components, and by progressive wear of the cutting tool such as grinding wheel wear between periodic grinding wheel truing operations.

What is claimed is:

1. In a grinding machine supporting and driving a given workpiece rotatably about a first predetermined axis and supporting and driving a given grinding wheel assembly rotatably about a second predetermined axis;
   a feed mechanism providing relative feeding and retracting movement between the given workpiece and the given grinding wheel assembly including,
   a precision incremental feeding means, and
   an operation counter and control means;
   said precision feeding means including,
   a reversible electric pulse motor operative in sequential equal increments in one direction to produce a precision incremental feeding movement at at least one selected frequency and in the other direction to produce a precision incremental retracting movement, and
   means operative to energize said electric pulse motor for feeding movement at a distance from a zero reference determined by a selected number of counts;
   said operation counter and control means including,
   a source of electric pulses released at at least one selected feeding frequency for said feeding movement and a selected frequency for said retracting movement, and
   pulse counting means for said electric pulses;
   said pulse counting means including,
   means operative whenever said electric pulse motor is energized to establish a zero reference for said pulse counting means,
   retract starting means operative when the given workpiece is reduced to its final size by the precision feeding movement to reset the zero reference and to energize said electric pulse motor for retracting movement, and
   a preset position sensing means activated when said electric pulse motor is energized in its retracting direction and operative when it counts up to said selected number of counts to stop said electric pulse motor at the distance from the reset zero reference determined thereby.

2. In a grinding machine as described in claim 1, and, in addition,
   safety means operative, in the event of electric power failure during the precision incremental feeding movement, to actuate said retract starting means to reset the zero reference and to energize said electric pulse motor for retracting movement, and thereby to activate said preset position sensing means,
   whereby, when electric power is restored, said electric pulse motor is operative to produce retracting movement from the feeding location at which electric power failed, and said preset position sensing means is thereafter operative when it counts up to said selected number of counts to stop said electric pulse motor the distance from the rest zero reference determined thereby.

3. In a grinding machine as described in claim 1, and, in addition, removed
   an electrical digital readout operative to display a corresponding initial reading when said precision incremental feeding means is at the distance from the zero reference corresponding to said selected number of counts, operative responsive to electric pulses throughout the feeding movement of said precision feeding means to provide a visual indication of the stock remaining to be moved from the given workpiece being ground, and reset responsive to electric pulses to its initial reading while said precision feeding means is retracted said selected number of counts from the reset zero reference, and
   means to energize said operation counter and control means when a grinding machine incorporating said feed mechanism is started up;
   said operation counter and control means including,
   a source of electric pulses at a relatively much higher frequency, and
   pulse counting number insertion means automatically operative when said operation counter and control means is energized with said feed mechanism fully retracted to count up to and insert in said electrical digital readout its initial reading prior to the feeding movement of said precision feeding means.

4. In a grinding machine as described in claim 3, wherein said feed mechanism includes,
   a rapid feeding means operative for feeding movement from its retracted position a predetermined advanced position at which said means to energize said electric pulse motor for feeding movement is operative, and operative toward its retracted position after said electric pulse motor is energized for retracting movement,
   whereby said feed mechanism is fully retracted when said electric pulse motor is stopped the distance from said reset zero reference determined by said selected number of counts and said rapid feeding means is in its retracted position.

5. In a grinding machine wherein a grinding operation is performed upon a given workpiece rotating about a first predetermined axis by a given grinding wheel assembly rotating about a second predetermined axis during a predetermined feeding cycle productive of relative feeding movement between the given workpiece and the given grinding wheel assembly, a given steadyrest, and a given gage head assembly;
- a feed mechanism operative according to said predetermined feeding cycle including,
- reversible rapid feeding means selectively operative to produce rapid feeding movement from its retracted position and rapid retracting movement into its retracted position,
- a reversible precision feeding means, and
- an operation counter and control means;
- said precision feeding means including,
- a reversible electric pulse motor operative in succeeding equal increments in one direction to produce a precision incremental feeding movement sequentially at selected different frequencies and in the other direction to produce a precision incremental retracting movement, and
- a switch means operative when said rapid feeding means has completed a predetermined feeding movement to energize said electric pulse motor in its feeding direction at a distance from a zero reference determined by a selected number of counts;
- said operation counter and control means including,
- a source of electric pulses released at said selected frequencies for said feeding movement and a selected frequency for said retracting movement, and
- pulse counting means for said electric pulses;
- said pulse counting means including,
- first and second preset position sensing means activated when said electric pulse motor is energized in its feeding direction, the first operative when it counts down to a first preset position to trigger the displacement of the given steadyrest from a retracted position to an operative position in engagement with the given workpiece being ground, and the second operative when it counts down to a second preset position to trigger the displacement of the given gage head assembly from a retracted position to an operative position in engagement with the given workpiece being ground,
- means operative whenever said electric pulse motor is energized to establish a zero reference for said pulse counting means,
- retract actuating means operative after the feeding movement is completed to reset the zero reference and to energize said electric pulse motor in its retracting direction, and
- third preset position sensing means activated when said electric pulse motor is energized in its retracting direction and operative when it counts up to said selected number of counts to stop said electric pulse motor at the distance from the reset zero reference determined thereby.

6. In a grinding machine supporting and driving a given workpiece rotatably about a first predetermined axis and supporting and driving a given grinding wheel assembly rotatably about a second predetermined axis;
- a feed mechanism providing relative feeding and retracting movement between the given workpiece and the given grinding wheel assembly including,
- a precision incremental feeding means, and
- an operation counter and control means;
- said precision feeding means including,
- a steadyrest,
- a gage head assembly,
- a reversible electric pulse motor operative in sequential equal increments in one direction to produce a precision incremental feeding movement at at least one selected frequency and in the other direction to produce a precision incremental retracting movement, and
- means operative to energize said electric pulse motor for feeding movement at a distance from a zero reference determined by a selected number of counts;
- said operation counter and control means including,
- a source of electric pulses released at at least one selected feeding frequency for said feeding movement and a selected frequency for said retracting movement, and
- pulse counting means for said electric pulses;
- said pulse counting means including,
- preset position sensing means activated when said electric pulse motor is energized for feeding movement and operative to trigger the displacement of said steadyrest from a retracted position to an operative position in engagement with the given workpiece being ground and to trigger the displacement of said gage head assembly from a retracted position to an operative position in engagement with the given workpiece being ground when said preset position sensing means counts down a predetermined number of counts therefor,
- means operative whenever said electric pulse motor is energized to establish a zero reference for said pulse counting means,
- retract starting means operative when the given workpiece is reduced to its final size by the precision feeding movement to reset the zero reference and to energize said electric pulse motor for retracting movement, and
- preset position sensing means activated when said electric pulse motor is energized for retracting movement and operative when it counts up to said selected number of counts to stop said electric pulse motor at the distance from the reset zero reference determined thereby.

7. In a grinding machine as described in claim 6, and, in addition,
- safety means operative, in the event of electric power failure during the precision incremental feeding movement, to actuate said retract starting means to reset the zero reference and to energize said electric pulse motor for retracting movement, and thereby to activate said preset position sensing means,
- whereby, when electric power is restored, said electric pulse motor is operative to produce retracting movement from the feeding location at which electric power failed, and said preset position sensing means is thereafter operative when it counts up to said selected number of counts to stop said electric pulse motor the distance from the reset zero reference determined thereby.

8. In a grinding machine supporting and driving a given workpiece rotatably about a first predetermined axis and supporting and driving a given grinding wheel assembly rotatably about a second predetermined axis;

a feed mechanism providing relative feeding and retracting movement between the given workpiece and the given grinding wheel assembly including,
a precision incremental feeding means, and
an operation counter and control means;
said precision feeding means including,
a steadyrest,
a gage head assembly,
a reversible electric pulse motor operative in sequential equal increments in one direction to produce a precision incremental feeding movement at at least one selected frequency and in the other direction to produce a precision incremental retracting movement, and
means operative to energize said electric pulse motor for feeding movement at a distance from a zero reference determined by a selected number of counts;
said operation counter and control means including,
a source of electric pulses released at at least one selected feeding frequency for said feeding movement and a selected frequency for said retracting movement, and
pulse counting means for said electric pulses;
said pulse counting means including,
first and second preset position sensing means activated when said electric pulse motor is energized for feeding movement, the first operative when it counts down to a first preset position to trigger the displacement of said steadyrest from a retracted position to an operative position in engagement with the given workpiece being ground, and the second operative when it counts down to a second preset position to trigger the displacement of said gage head assembly from a retracted position to an operative position in engagement with the given workpiece being ground,
means operative whenever said electric pulse motor is energized to establish a zero reference for said pulse counting means,
retract starting means operative when the given workpiece is reduced to its final size by the precision feeding movement to reset the zero reference and to energize said electric pulse motor for retracting movement, and
preset position sensing means activated when said electric pulse motor is energized for retracting movement and operative when it counts up to said selected number of counts to stop said electric pulse motor at the distance from the reset zero reference determined thereby.

9. In a grinding machine wherein a grinding operation is performed upon a given workpiece rotating about a first predetermined axis by a given grinding wheel assembly rotating about a second predetermined axis during a predetermined feeding cycle productive of relative feeding movement between the given workpiece and the given grinding wheel assembly, a given steadyrest, and a given gage head assembly;
a feed mechanism operative according to said predetermined feeding cycle including,
reversible rapid feeding means selectively operative to produce rapid feeding movement from its retracted position and rapid retracting movement into its retracted position,
reversible precision feeding means, and
an operation counter and control means;
said precision feeding means including,
a gage head assembly,
a timer means,
a reversible electric pulse motor operative in succeeding equal increments in one direction to produce a precision incremental feeding movement sequentially at selected different frequencies and in the other direction to produce a precision incremental retracting movement, and
a switch means operative when said rapid feeding means has completed a predetermined feeding movement to energize said electric pulse motor for incremental feeding movement at a distance from a zero reference determined by a selected number of counts, and
means operative during said precision feeding movement to maintain said gage head assembly in operative relation to the given workpiece being ground;
said gage head assembly including,
a first set of gage contacts on said gage head assembly operative when they function to energize said electric pulse motor to produce incremental feeding movement at a second predetermined relatively reduced frequency,
a second set of gage contacts on said gage head assembly operative when they function to stop said electric pulse motor and to actuate said timer means operative after a predetermined short time interval, and
a third set of gage contacts on said gage head assembly operative when the given workpiece reaches its prescribed final size during said predetermined short time interval to actuate means to reset the zero reference and to energize said electric pulse motor in its retracting direction;
said operation counter and control means including,
a source of electric pulses released at said selected frequencies for said feeding movement and a selected frequency for said retracting movement, and
pulse counting means for said electric pulses;
said pulse counting means including,
means operative whenever said electric pulse motor is energized to establish a zero reference for said pulse counting means, and
preset position sensing means activated when said electric pulse motor is energized for retracting movement and operative when it counts up to said selected number of counts to stop said electric pulse motor at the distance from the reset zero reference determined thereby;
said timer means being operative when said third set of gage contacts has not operated during said predetermined short time interval to reenergize said electric pulse motor at its second predetermined relatively reduced feed rate until said third set of gage contacts operate.

10. In a grinding machine as described in claim 9, wherein,
said operation counting and control means includes,
safety means operative when said precision feeding means reaches a position at a distance beyond said zero reference corresponding to a predetermined small number of counts reached either if both said third and said fourth sets of gage contacts fail to function after said electric pulse motor has been energized at its second relatively reduced frequency or if said fourth sets of gage contacts fails to function after said electric pulse motor has been reenergized at its second relatively reduced frequency to stop said electric pulse motor, to maintain said retract actuating means inoperative, to energize said electric pulse motor for incremental retract movement, and to activate said preset position sensing means thereafter operative when it counts up to said selected number of counts to stop said electric pulse motor at the distance from the zero reference determined thereby.

11. In a grinding machine wherein a grinding operation is performed upon a given workpiece rotating about a first predetermined axis by a given grinding wheel assembly rotating about a second predetermined axis during a predetermined feeding cycle productive of relative feeding movement between the given workpiece and the given grinding wheel assembly, a given steadyrest, and a given gage head assembly;
 a feed mechanism operative according to said predetermined feeding cycle including,
 reversible rapid feeding means selectively operative to produce rapid feeding movement from its retracted position and rapid retracting movement in to its retracted position,
 reversible precision feeding means, and
 an operation counter and control means;
 said precision feeding means including,
 a gage head assembly,
 a timer means,
 a reversible electric pulse motor operative in succeeding equal increments in one direction to produce a precision incremental feeding movement sequentially at selected different frequencies and in the other direction to produce a precision incremental retracting movement, and
 a switch means operative when said rapid feeding means has completed a predetermined feeding movement to energize said electric pulse motor for incremental feeding movement at a distance from a zero reference determined by a selected number of counts, and
 means operative during said precision feeding movement to maintain said gage head assembly in operative relation to the given workpiece being ground;
 said gage head assembly including,
 a first set of gage contacts on said gage head assembly operative when they function to stop said electric pulse motor and to actuate said timer means operative after a predetermined short time interval,
 a second set of gage contacts on said gage head assembly operative when they function to energize said electric pulse motor for incremental feeding movement at a second predetermined relatively reduced frequency,
 a third set of gage contacts on said gage head assembly operative when they function to stop said electric pulse motor, and
 a fourth set of gage contacts on said gage head assembly operative when the given workpiece reaches its prescribed final size to actuate means to reset the zero reference and to energize said electric pulse motor for incremental retracting movement;
 said timer means being operative after said predetermined short time interval to energize said electric pulse motor at its second predetermined relatively reduced frequency, if said second gage contacts have not meanwhile functioned;
 said operation counter and control means including,
 a source of electric pulses released at said selected frequencies for said feeding movement and a selected frequency for said retracting movement, and
 pulse counting means for said electric pulses;
 said pulse counting means including,
 means operative whenever said electric pulse motor is energized to establish a zero reference for said pulse counting means, and
 preset position sensing means activated when said electric pulse motor is energized for incremental retracting movement and operative when it counts up to said selected number of counts to stop said electric pulse motor at the distance from the reset zero reference determined thereby.

12. In a grinding machine as described in claim 11, wherein,
 said operation counting and control means includes,
 second preset position sensing means activated when said electric pulse motor is energized for incremental feeding movement and operative a predetermined number of counts from said zero reference reached if said first and said second sets of gage contacts fail to function respectively to stop electric pulse motor and to energize said electric pulse motor to convert the incremental feeding movement of said electric pulse motor from its first frequency to its second relatively reduced frequency.

13. In a grinding machine as described in claim 1, and, in addition,
 position verification and safety means including,
 transducer means coupled to said electric pulse motor responsive to the number of incremental movements of said electric pulse motor to produce a corresponding number of pulses,
 pulse comparing means to receive and compare for coincidence the number of pulses applied to said electric pulse motor and the number of pulses produced by said transducer means, and
 safety stopping means to stop said feed mechanism in response to any departure from coincidence in excess of a predetermined small quantity between the number of pulses applied to said electric pulse motor and the number of pulses produced by said transducer means.

14. In a grinding machine as described in claim 6, and, in addition,
 position verification and safety means including,
 transducer means coupled to said electric pulse motor responsive to the number of incremental movements of said electric pulse motor to produce a corresponding number of pulses,
 pulse comparing means to receive and compare for coincidence an input indicating the number of pulses applied to said electric pulse motor and an input indicating the number of pulses produced by said transducer means, safety stopping means to stop said feed mechanism operative under dynamic conditions thereof in response to any departure from coincidence in excess of a predetermined relatively larger quantity between the indicated number of pulses applied to said electric pulse motor and the indicated number of pulses produced by said transducer means, and safety stopping means to stop said feed mechanism operative under static conditions thereof in response to any departure from coincidence in excess of a predetermined relatively smaller cumulative quantity between the indicated number of pulses applied to said electric pulse motor and the indicated number of pulses produced by said transducer means.

15. In a grinding machine as described in claim 9, and, in addition, position verification and safety means including, transducer means coupled to said electric pulse motor responsive to the number of incremental movements of said electric pulse motor to produce a corresponding number of pulses, pulse comparing means to receive and compare for coincidence signals indicating the number of pulses applied to said electric pulse motor and signals indicating the number of pulses produced by said transducer means, and safety stopping means to prevent recycling said feed mechanism in response to any departure from coincidence after any cycle in excess of a predetermined small quantity between the indicated number of pulses applied to said electric pulse motor and the indicated number of pulses produced by said transducer means.

16. In a grinding machine as described in claim 11, and, in addition, position verification and safety means including, transducer means coupled to said electric pulse motor responsive to the number of incremental movements of said electric pulse motor to produce a corresponding number of pulses, pulse comparing means to receive and compare for coincidence signals indicating the number of pulses applied to said electric pulse motor and signals indicating the number of pulses produced by said transducer means, and safety stopping means to prevent recycling said feed mechanism in response to any departure from coincidence after after any cycle in excess of a predetermined small quantity between the indicated number of pulses applied to said electric pulse motor and the indicated number of pulses produced by said transducer means.

17. In a grinding machine wherein the grinding operation is performed upon a given workpiece rotating about a first predetermined axis by a given grinding wheel assembly rotating about a second predetermined axis during a predetermined feeding cycle productive of relative feeding movement between the given grinding wheel assembly and the given workpiece;

an incremental feeding means including first and second operatively interconnected rotary drive motors, the first such motor comprising an electric stepping motor operative sequentially at a plurality of selected frequencies within a predetermined range of frequencies as determined by the setting of operation counting control means therefor and itself productive of at least a portion of the driving torque required to provide relative feeding movement at any selected frequency within the predetermined range of frequencies, and the second such motor comprising a rotary hydraulic motor coupled to and operative in slaved relation to said electric stepping motor;

said rotary hydraulic motor being maintained so by the continuous application of a predetermined hydraulic pressure thereto as to be productive of a supplemental driving torque sufficient in combination with the driving torque produced by said electric stepping motor to provide the total driving torque required for incremental feeding movement at any selected frequency within the predetermined range of frequencies, but insufficient alone to produce feeding movement.

18. In a grinding machine as described in claim 17, wherein, said rotary hydraulic motor is selectively operative, independent of said electric stepping motor, in response to the application thereto of a second relatively higher predetermined hydraulic pressure to produce relative movement between the given grinding wheel assembly and the given workpiece, with said electric stepping motor maintained inoperative and consequently unrestrained rotatably.

19. In a grinding machine as described in claim 17, wherein, said incremental feeding means includes a relatively nonrotatable driven element and a relatively rotatable driving element operatively engaged with said driven element, said first and said second rotary drive motors are operatively interconnected by a common drive shaft, and said drive shaft is operatively connected to said driving element by a rotary coupling means.

20. In a grinding machine as described in claim 19, wherein, said rotary coupling means comprises a worm rigidly secured to and rotatable with said drive shaft and a worm wheel operatively engaged with said worm and so supported and constrained by said driving element that rotation of said worm wheel responsive to rotation of said worm produces corresponding rotation of said driving element.

* * * * *